United States Patent Office 3,418,244
Patented Dec. 24, 1968

3,418,244
METHOD FOR PRODUCING BORIC OXIDE
Robert V. St. Louis, Los Angeles, Joseph G. Whiten, Fullerton, and Norman T. Sprouse, Brea, Calif., assignors to United States Borax Chemical Corporation, Los Angeles, Calif., a corporation of Nevada
No Drawing. Filed Mar. 28, 1966, Ser. No. 537,697
13 Claims. (Cl. 252—188.3)

ABSTRACT OF THE DISCLOSURE

Sodium borate-sulfuric acid feed mixture for conversion to boric oxide is prepared by adding up to about 25%, by weight, of water to sodium tetraborate pentahydrate prior to combining the borate with sulfuric acid. The water can be added as free water or by mixing the tetraborate pentahydrate with up to about 150% of its weight of sodium tetraborate decahydrate.

---

This invention relates to the production of boric oxide and, more particularly, it provides an improved process for producing boric oxide directly from alkali metal borates and sulfuric acid.

Boric oxide finds many uses in industry, especially in applications in which a high $B_2O_3$ content material, containing little or no oxides of the alkali or alkaline earth metals, is desired. Thus, the oxide is used in the production of many special glass compositions, enamels, alloys, in the preparation of fluxes, and as a catalyst in organic reactions. However, the price of boric oxide has remained relatively high because of the price of the raw materials as well as the complex processing conditions required for its production. Boric oxide is made commercially by heating boric acid at an elevated temperature over a relatively long period of time. The boric acid starting material is generally obtained by reaction of borax or colemanite with sulfuric acid or hydrochloric acid in an aqueous medium. Therefore, a simple straightforward process for making boric oxide directly from low-cost raw materials is considered to represent a significant advance in the art of inorganic borates.

The commonly assigned, copending application Ser. No. 432,652 filed Feb. 15, 1965 by Lloyd L. Fusby, and now abandoned in favor of Ser. No. 563,015 filed June 22, 1966, discloses and claims a novel process for producing vitreous boric oxide directly from metal borates, such as sodium tetraborate, and sulfuric acid. In a preferred embodiment according to this process, concentrated sulfuric acid and sodium tetraborate pentahydrate can be combined in a mixing vessel to provide a feed mixture which is then heated to an elevated temperature of at least about 750° C. to form two molten layers. The upper molten layer is separated and cooled to provide the vitreous boric oxide product. A temperature of about 800° to about 900° C. is generally preferred for forming the two molten layers.

However, in the preparation of the feed mixture, when sulfuric acid and sodium tetraborate pentahydrate are combined, the mixture generally goes through a pasty-like stage during the early to middle stage of the mixing process. Generally this pasty material resolidifies in the latter stage of the process. Some types of mixers are unable to handle a pasty stage at all and many other types of mixers can handle the pasty stage only with difficulty. Furthermore, if the feed is discharged from the mixing vessel as a paste, it can resolidify to large lumps and must be reground before feeding to the furnace for heating. Accordingly, it is often desirable to avoid the formation of a pasty stage during the preparation of the sulfuric acid-sodium tetraborate feed mixture.

The present invention provides an improved process for preparing a sodium borate-sulfuric acid feed mixture for subsequent conversion to boric oxide which does not go through a pasty stage during preparation of the mixture. According to the present invention, a small amount of excess water is added to sodium tetraborate pentahydrate prior to combination with the sulfuric acid. Up to about 25% by weight of excess water, based on the weight of the sodium tetraborate pentahydrate has been found to be effective in avoiding the pasty stage during the formation of the feed mixture and preferably about 2% to about 15% by weight of water is employed.

The water can be readily added by spraying water or water vapor onto the sodium tetraborate pentahydrate. Alternatively, the water can be added by merely mixing the sodium tetraborate pentahydrate with up to about 150%, preferably about 15% to 100%, of its weight, of sodium tetraborate decahydrate. Both procedures provide a sodium tetraborate material which, when combined with about equimolar amounts of sulfuric acid, will give a granular, dry-appearing, free-flowing feed mixture without going through a pasty stage.

About equimolar amounts of sulfuric acid and sodium tetraborate are employed in the feed preparation and preferably concentrated sulfuric acid of at least about 90% $H_2SO_4$, usually about 96–98% $H_2SO_4$, is used. A slight molar excess of the acid, such as up to about 10%, by weight, can also be employed if desired, and in the preparation of some feed mixtures can be used advantageously.

The resultant sodium tetraborate-sulfuric acid feed mixture is fed to a furnace and heated to an elevated temperature to form two molten layers, such as disclosed in the aforementioned copending application of Lloyd L. Fusby. The upper layer which is boric oxide and the lower layer which is sodium sulfate are separated and cooled to provide the granular products.

The following examples illustrate the present process but the invention is not to be considered limited to the specific examples given.

EXAMPLE I

Granular sodium tetraborate pentahydrate (18 lbs. 15 oz.) was placed in a Sigma mixer and 1.95 lbs. of water was added by spraying it onto the borate granules and mixing the mass for five minutes. The added water corresponds to 10%, by weight, of the sodium tetraborate. Concentrated sulfuric acid (95%) (7 lbs. 5 oz.) was then added to the borate by spraying it onto the granules with mixing over a period of four minutes. The mixture remained granular and free-flowing without any evidence of a pasty stage. After six to seven minutes of additional mixing, the feed mixture was discharged to give a free-flowing, granular material.

EXAMPLE II

Following the procedure of Example I, 585 grams of $H_2O$ was added to 8603 grams of sodium tetraborate pentahydrate. The added water corresponds to about 7% by weight of the borate. Concentrated sulfuric acid (3096 grams) was added over a period of about six minutes and then mixing continued for an additional four minutes to provide a free-flowing, granular material. There was no evidence of a pasty stage during preparation.

EXAMPLE III

Following the procedure of Examples I and II, 1755 grams of $H_2O$ (corresponding to 20% added water) was added to 8603 grams of sodium tetraborate pentahydrate. Concentrated sulfuric acid (3096 grams) was then added over a period of about one minute and mixing continued for about 19 minutes. The product was a free-flowing granular material. There was no evidence of a pasty stage during preparation.

EXAMPLE IV

A mixture of 5.252 kilograms of granular sodium tetraborate pentahydrate and 4.558 kilograms of granular sodium tetraborate decahydrate was placed in a Sigma mixer. The extra five moles of water of crystallization in this quantity of sodium tetraborate decahydrate is equivalent to 12% excess liquid water added to sodium tetraborate pentahydrate. Concentrated sulfuric acid (95%) (3.33 kilograms) was then added to the mixture of tetraborate over a period of two and one half minutes. No pasty stage was observed at any time during the mixing process. After a mixing time of about 15 minutes, the mixture was discharged from the mixer as a granular, free-flowing material.

EXAMPLE V

Following the procedure of Example IV, 7778 grams of sodium tetraborate pentahydrate and 1140 grams of sodium tetraborate decahydrate were mixed together to give a 7:1 weight ratio, corresponding to 3.1% excess liquid water added to the pentahydrate. Concentrated sulfuric acid (3330 grams) was added over a period of three minutes and then mixing was continued for nine minutes to give a free-flowing granular powder. No pasty stage was observed during the mixing process.

The feed mixtures prepared according to the above examples were fed to a furnace and converted to boric oxide and sodium sulfate according to the process disclosed in the aforementioned copending application of Lloyd L. Fusby.

Preferably, if less than about 7% excess sulfuric acid, over the stoichiometric weight, is employed, the excess moisture in the feed should be removed such as by drying prior to feeding to the furnace. The drying is readily accomplished, such as by heating in electric ovens, and should take place at a temperature no higher than about 300° C.

Various changes and modifications of the invention can be made and, to the extent that such variations incorporate the spirit of this invention, they are intended to be included within the scope of the appended claims.

What is claimed is:

1. The process for preparing a granular sodium borate-sulfuric acid feed mixture for conversion to boric oxide which comprises adding up to about 25%, by weight, of water to granular sodium tetraborate pentahydrate and then combining the treated borate with about an equimolar amount of sulfuric acid, whereby the mixture is maintained in a granular state and formation of a pasty mixture is avoided.

2. The process according to claim 1 wherein said water is added by spraying onto said sodium tetraborate pentahydrate.

3. The process according to claim 1 wherein said water is added by mixing said sodium tetraborate pentahydrate with up to about 150% of its weight of sodium tetraborate decahydrate.

4. The process according to claim 1 wherein said added water corresponds to about 2% to 15%, by weight of the sodium tetraborate pentahydrate.

5. The process according to claim 1 in which the sulfuric acid is concentrated sulfuric acid of about 96–98% $H_2SO_4$.

6. The process according to claim 1 wherein said water is added by mixing said sodium tetraborate pentahydrate with from about 15% to 100% of its weight of sodium tetraborate decahydrate.

7. The process according to claim 1 in which up to about 10% excess concentrated sulfuric acid of at least 90% $H_2SO_4$ is employed.

8. The process according to claim 2 in which the resultant feed mixture is dried at an elevated temperature up to about 300° C. for a period of time sufficient to remove the added water.

9. The process for preparing a granular sodium borate-sulfuric acid feed mixture for conversion to vitreous boric oxide which comprises treating granular sodium tetraborate pentahydrate with from about 2% to about 15%, by weight, of water, spraying about an equimolar amount of concentrated sulfuric acid of at least 90% $H_2SO_4$ onto the treated borate while mixing the reaction mass, and continuing mixing of the reaction mass for a period of time sufficient to give a free-flowing, granular feed mixture, whereby the mixture is maintained in a granular state and formation of a pasty mixture is avoided.

10. The process according to claim 9 in which said sodium tetraborate pentahydrate is mixed and sprayed with said water.

11. The process according to claim 9 in which said sodium tetraborate pentahydrate is intimately mixed with from about 15% to 100% of its weight, of sodium tetraborate decahydrate.

12. The process according to claim 9 in which an excess up to about 10% of sulfuric acid is sprayed onto the treated borate.

13. The process according to claim 10 in which the resultant granular feed mixture is dried at an elevated temperature less than about 300° C. prior to conversion to vitreous boric oxide for a period of time sufficient to remove the added water.

References Cited

UNITED STATES PATENTS

| | | | |
|---|---|---|---|
| 1,888,391 | 11/1932 | Newman | 23—149 |
| 3,216,795 | 11/1965 | Brown et al. | 23—149 |

LEON D. ROSDOL, *Primary Examiner.*

S. D. SCHWARTZ, *Assistant Examiner.*

U.S. Cl. X.R.

23—149